United States Patent [19]

Fabris et al.

[11] Patent Number: 4,789,703

[45] Date of Patent: Dec. 6, 1988

[54] ABRASION RESISTANT COATINGS

[75] Inventors: Hubert J. Fabris, Akron; Earl G. Melby, Uniontown; Kohji Y. Chihara; Harry W. Cocain, both of Cuyahoga Falls, all of Ohio

[73] Assignee: GenCorp Inc., Akron, Ohio

[21] Appl. No.: 52,944

[22] Filed: May 22, 1987

Related U.S. Application Data

[62] Division of Ser. No. 832,281, Feb. 24, 1986, Pat. No. 4,676,995.

[51] Int. Cl.$^4$ .................. C08K 5/02; C08L 75/00; C08L 77/00; C08L 77/02
[52] U.S. Cl. .................. 524/464; 524/597; 525/329.4; 525/356; 525/418; 525/420
[58] Field of Search .................. 524/464, 473, 597; 525/420, 329.4, 356, 418

[56] References Cited

U.S. PATENT DOCUMENTS

| | | | |
|---|---|---|---|
| 3,479,213 | 11/1969 | Takeda | 524/464 |
| 4,505,978 | 3/1985 | Smith | 525/420 |
| 4,603,178 | 7/1986 | Phan et al. | 525/420 |

*Primary Examiner*—Allan M. Lieberman

[57] ABSTRACT

Pelletized thermoplastic polymers or resins containing (—CONH—) groups such as the nylons can readily be brominated or chlorinated in organic solvents to convert the (—NH—) units to (—NBr—) or (—NCl—) units and to form solutions of the N-brominated or N-chlorinated thermoplastic polymers or resins. These N-brominated or N-chlorinated thermoplastic polymer solutions can be coated on a cellular or solid rubbery hydrocarbon polymer substrate, such as an EPDM rubber in the form of a weatherstrip or glass run channel, dried and irradiated with ultraviolet light or heated at a temperature and for a period of time sufficient to reform the amide (—CONH—) groups and to provide the rubbery substrate with an adherent and abrasion resistant coating which also exhibits reduced ice adhesion and coefficient of friction.

6 Claims, 3 Drawing Sheets

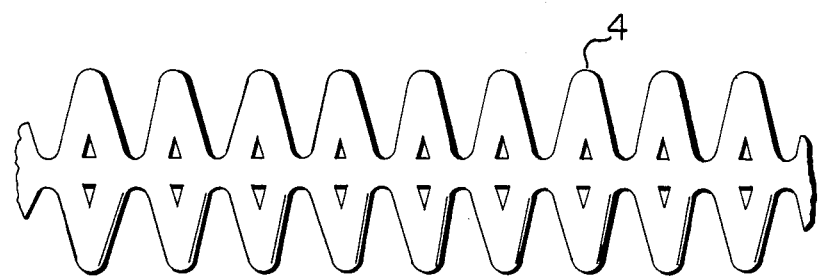
Fig. 2
Fig. 3
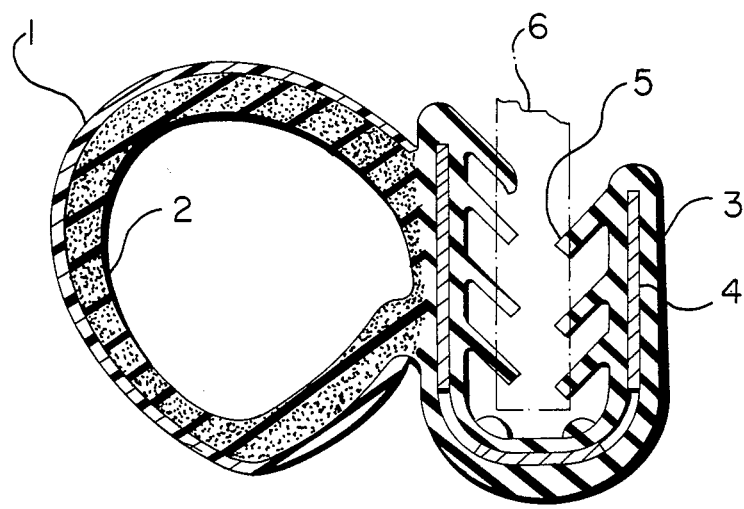

ABRASION RESISTANT COATINGS

This is a divisional application of application Ser. No. 06/832,281 filed Feb. 24, 1986, now U.S. Pat. No. 4,676,995.

This invention relates to abrasion resistant coatings and in particular to abrasion resistant coatings of thermoplastic polymers or resins having amide (—CONH—) groups on rubbery substrates.

Rubber weatherstrip materials used around doors and windows in automobiles are subject to extensive wear. For example, abrasion of the automotive weatherstrip occurs in various areas around an automobile door opening, for example in corner areas as the door is closed and in the lower areas of the door opening as a result of contact with the feet of passengers entering or leaving the automobile. This abrasion ultimately results in severe damage and failure of the weatherstrip. Automobile rubbery glass run channels, also, are subjected to considerable wear.

An object of this invention is to avoid the difficulties alluded to above and to provide rubbery or rubber substrates with abrasion resistant coatings from thermoplastic polymers having amide (—CONH—) groups.

Another object of this invention is to provide a method for making a composition useful for forming an abrasion resistant coating on rubbery hydrocarbon polymer substrates.

A further object of this invention is to provide a method for forming abrasion resistant coatings on rubbery substrates.

These and other objects and advantages of the present invention will become more apparent to those skilled in the art from the following detailed description, working examples and accompanying drawings in which FIG. 1 is a vertical perspective view of an automobile weatherstrip;

FIG. 2 is a plan view of a reinforcing perforated metal strip for the weatherstrip;

FIG. 3 is a cross section of the weatherstrip;

SUMMARY OF THE INVENTION

Figure 1:
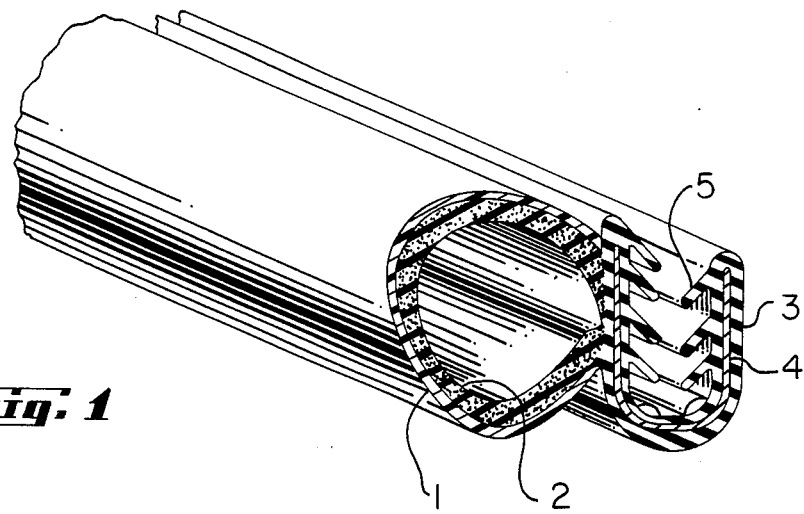
Figure 4:
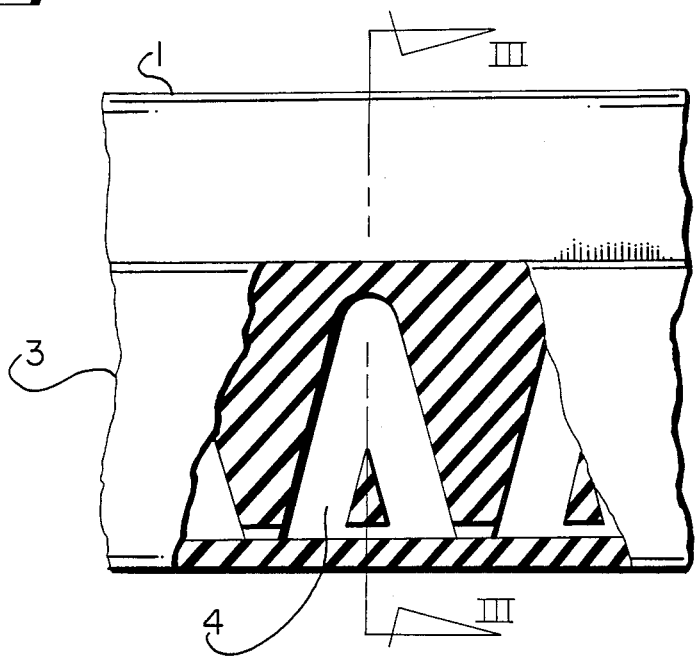
FIG. 4 is a side elevation of the weatherstrip with a portion thereof broken away to show that the weatherstrip includes the metal strip.

It has been found that a solid, pelletized and thermoplastic polymer or resin having amide, (—CONH—), groups such as nylon 11 can be brominated or chlorinated in aqueous suspension in the presence of an organic solvent to form a solution in the solvent of a bromine or chlorine containing thermoplastic polymer wherein the (—NH—) unit has become a (—NBr—) or (—NCl—) unit. A solution of this material when applied to a cured or vulcanized rubbery substrate, e.g., an EPDM rubber, dried to remove the solvent and then exposed to ultraviolet radiation or heated at a temperature and for a period of time sufficient to remove the chlorine or bromine atoms and to reform the (—NH—) units to reproduce the amide (—CONH—) group yields an adherent and abrasion resistant polymer or resin coating on the rubber substrate. In addition to an improvement in abrasion resistance the coating provides improvements in other properties such as ice adhesion and coefficient of friction.

In making a weatherstrip as depicted in FIGS. 1 to 4 of the drawings two vulcanizable EPDM rubber compounds are coextruded, one compound being generally of U-shape and containing the perforated metal reinforcing sheet formed in the shape of a U and the other compound being hollow and generally round and containing a blowing agent. After leaving the extruder, the composite strip is passed through a molten salt bath to effect vulcanization or curing as well as blowing and is then washed or otherwise treated to remove any salt on the surface. Other methods, of course, can be used for vulcanization. After cleaning, drying and cooling the sponge or blown part of the weatherstrip is coated on its outer surface with the composition of the present invention, dried and heated under ultraviolet lamps to form the adherent and abrasion resistance plastic coating of this invention on the surface of the resilient sponge part of the weatherstrip. The sponge part of the weatherstrip, of course, is the part subject to the abrasive action during the opening and closing of doors and hoods of automobiles and other vehicles. The sponge part of the coextrusion can be solid instead of hollow, likewise, the part of the coextrusion subject to abrasion can be a hollow, round and solid integral part, or it can be a round solid integral part of the coextrusion.

In FIGS. 1 to 4 coating 1 of this invention is adherent to the surface of rubber foam part 2 integral with solid U-shaped surface of rubber member 3 containing perforated U-shaped metal member 4. Rubber member 4 also contains a number of rubber fingers 5 to grip flange 6 of the car door or hood.

Figure 5:
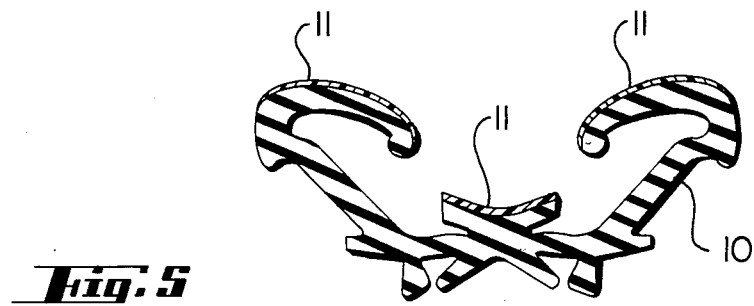
FIG. 5 is a vertical perspective view of an automobile glass run channel.
Figure 6:
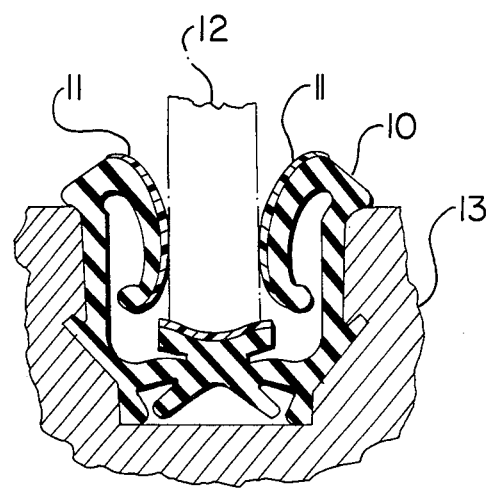
FIG. 6 is a cross section of the glass run channel showing its use.

In FIGS. 5 and 6 there is shown a glass run channel made of a vulcanizable EPDM rubber which has been extruded, cured in a salt bath, cleaned, dried and cooled. The surfaces to be in contact with the glass have been coated with the composition of the present invention, dried and heated under ultraviolet lamps to form an abrasion resistant coating. Rubber extrusion 10 has coating 11 on several parts to be in contact with glass 12 such as the window glass in an automobile window frame 13.

DISCUSSION OF DETAILS AND PREFERRED EMBODIMENTS

The (—CONH—) containing abrasion resistant thermoplastic polymer is selected from the group consisting of polyacrylamides, polyamide-imides, polysulfonamides, polyurethanes, polyureas, polyurethane-ureas and polyamides and mixtures of the same. These polymers are well known as shown by the "Encyclopedia Of Polymer Science And Technology," Interscience Publishers, a division of John Wiley & Sons, Inc., New York, Vol. 1 (1964), Vol. 10 (1969) and Vol. 11 (1969) and "Vinyl And Related Polymers," Schildknecht, John Wiley & Sons, Inc., New York, 1952. Of these N-containing thermoplastic polymers it is preferred to use the polyamides such as the nylons.

Examples of the nylons are those having long chains with recurring (—CONH—) groups as an integral part of the polymer chain. They are made by polyaddition of acrylamide, ring opening polymerization of, e.g., pyrrolidone, caprolactam and lauric lactam or by polycondensation of, e.g., aminononanoic acid, 11-aminoundecanoic acid, hexamethylene diamine with adipic or sebacic acid and p-phenylene diamine with terephthalic acid and the like and modifications of the same as illustrated by U.S. Pat. Nos. 4,414,362 and 4,448,956 and others. Mixtures of nylons can be used.

The thermoplastic (—CONH—) polymer to be chlorinated or brominated is generally used in pelletized form. If the thermoplastic is in massive form as obtained, it may be reduced in size using granulators, dicers, die face cutters, strand pelletizers, underwater pelletizers and so forth. If necessary, the thermoplastic may first be cooled or frozen to facilitate size reduction.

Various reagents and mixtures thereof can be used to brominate or chlorinate the thermoplastic (—CONH—) polymers including sodium hypobromite, hypochlorous acid, salts of hypochlorous acid (aqueous calcium hypochlorite or aqueous sodium hypochlorite (preferred)), alkyl hypochlorites (t-butyl hypochlorite), elemental bromine or chlorine, dibromomonoxide and dichloromonoxide. Aqueous solutions of hypobromous acid or hypochlorous acid and the like are preferably used for bromination or chlorination. These solutions are most conveniently obtained by addition of acids such as aqueous hydrobromic, hydrochloric (preferred), sulfuric or acetic acid to solutions of the sodium salts of hypobromic or preferably hypochloric acid.

The halogenation reaction is carried out in the presence of an organic solvent. This solvent has to be immiscible with water and inert under the reaction conditions; it has to dissolve the N-halogenated polymer with ease but not the original amide group containing polymer. Examples of solvents are methylene chloride (preferred), carbon tetrachloride, chloroform, tetrachloroethane, trichloroethane, benzene and toluene.

A preferred procedure for the preparation of the N-halogenated material used in the invention is to disperse pellets of the (—CONH—) polymer in a mixture of an aqueous solution of Na-hypochlorite (CHLOROX, 5.25% Na-hypochlorite) and the organic solvent ($CH_2Cl_2$) and add concentrated hydrochloric acid in a nearly stoichometric amount based on the Na-hypochlorite. The mixture is slurried at room temperature (ca 25°) or below until the pellets dissolve. The organic layer containing the desired product is separated and washed with water. The solution obtained can be used in the coating process directly or after appropriate dilution. Or, the solid product can be obtained by solvent evaporation for easier shipment.

The brominatd or chlorinated thermoplastic (—CONH—) polymer or mixture thereof is used in an amount of from about 1 to 50%, preferably about 2 to 4%, by weight solids in a solvent such as one or more of the above chlorinated hydrocarbons like methylene chloride for use as a coating material. A uniform application of the coating can be obtained with a low solids solution. Fillers such as the finely divided silicas, also, can be included in the coating formulation to reduce gloss, lower cost and improve performance. It has been found that the addition of a small amount of finely divided silica actually improved abrasion resistance. Other pigments and additives such as carbon black can be added to the coating composition.

The rubber substrate such as a weatherstrip or glass run channel and so forth can be a rubbery hydrocarbon polymer selected from the group consisting of natural rubber; high cis-polyisoprene; emulsion styrene-butadiene copolymers; solution styrene-butadiene copolymers which may be low vinyl, medium vinyl, high vinyl or high trans random SBR's; butadiene- or isoprene-styrene star copolymers; block (thermoplastic elastomer) styrene-butadiene-styrene or styrene-isoprene-styrene copolymers; butyl rubber; high molecular weight polyisobutylenes; EPDMs (ethylene-propylene-nonconjugated diene copolymers) (preferred) and so forth and mixtures of the same. These polymers are well-known. These rubbery polymers are mixed with the usual curing and compounding agents for the particular polymers being used and cured or vulcanized. Examples of some agents are reinforcing blacks; silica; clay; $TiO_2$; stearic acid; zinc oxide; sulfur; dibenzo GMF with red lead or with peroxides; peroxides; sulfur furnishing materials; retarders; accelerators; antioxidants; blowing agents like azodicarbonamide, p,p'-oxybis(benzenesulfonyl hydrazide) and dinitrosopentamethylene tetramine (preferred) and so forth. The rubber may be solid or blown (cellular - open or closed cell) depending on the ultimate use.

Ethylene-propylene-nonconjugated diene rubbery terpolymers (EPDMs) are made by the copolymerization of ethylene, propylene and a non-conjugated diene such as 1,4-hexadiene (preferred), ethylidene norbornene or dicyclopentadiene. They may be crystalline or non-crystalline and may be random, block or sequence terpolymers. Their relative unsaturation can vary from about 0.7 to 7.5. The mole % of ethylene can vary from about 50 to 85 and the raw (uncured and uncompounded) Mooney viscosity (ML 1+8 at 250° F.) can vary from about 14 to 84. Rubbery or elastomeric EPDM terpolymers, methods for making them and methods for curing them are shown by "Rubber Chemistry And Technology," Volume 45, No. 1, March, 1972, Division of Rubber Chemistry, Inc., American Chemical Society, pages 709 to 881; "Rubber Technology," 2nd Ed., Morton, Van Nostrand Reinhold Company, New York, 1973, Chapter 9; "Polymer Chemistry of Synthetic Elastomers," Part II, High Polymers Series, Vol. 23, John Wiley & Sons Inc., New York, 1969, Chapter 7; "Encyclopedia Of Polymer Science and Technology," Interscience Publishers a division of John Wiley & Sons, Inc. New York, Vol. 6 (1967) pages 367-8 and Vol. 5 (1966) page 414 and "Synthetic Rubber Manual," International Institute of Synthetic Rubber Producers, Inc., 8th Ed., 1980.

The coating solution can be applied to the rubbery substrate such as a weatherstrip or glass run channel using any conventional coating technique (brush, print roller, dip or spray). The coating may be applied to one side or to all sides. Generally, it is applied only to the side requiring improved abrasion resistance. After application to the weatherstrip the solvent is evaporated leaving a film of N-brominated or N-chlorinated thermoplastic on the surface. By application of heat or UV irradiation the bromine or the chlorine is released from the nitrogen atoms and the (—NH—) unit and carbonyl band are reformed to provide the recurring amide groups. Some cross-linking may take place during this process. These treatments result in formation of strong, abrasion resistant and non-tacky coatings. Good adhesion to the rubber results since the N-brominated or N-chlorinated thermoplastic is a strong oxidizing agent which can react with the rubbery substrate generating polar groups on its surface, and/or giving primary bonding between the rubber and the coating at the interface. The preferred method is to use UV treatment which is much faster and gives a consistent product. The irradiation with ultraviolet light should be done at wavelengths of not over about 375 nm, preferably not over about 350 nm. Other treatments may be effective in converting the N-brominated or N-chlorinated thermoplastic back to the amide form (e.g., treatment with steam, aqueous base and/or a solution of a reducing agent such as sodium bisulfite or sulfite). The heat treatment or other treatment is conducted for a period of time and at a temperature sufficient for complete conversion of the N-brominated or N-chlorinated units of the thermoplastic back to the amide NH form.

Although the working examples are directed mostly to improvement of the abrasion resistance of automotive weatherstrip and glass run channel, the coating material may be useful to improve the abrasion resistance of other substrates such as windshield wipers, vinyl films, upholstery, luggage and so forth.

The following examples will serve to illustrate the present invention with more particularity to those skilled in the art. In the following examples the parts are parts by weight unless otherwise indicated.

EXAMPLE 1

Preparation of N-Chlorinated Nylon 11

Into a pint bottle were placed CHLOROX (118 grams, 5.25% aqueous sodium hypochlorite) and methylene chloride (100 ml). Concentrated hydrochloric acid (8.0 grams) was slowly added with stirring. The contents of the bottle were allowed to cool to room temperature (ca 25° C.) and nylon 11 pellets (5.0 grams, Rilsan Corporation) were added. This mixture was stirred for 2 hours at room temperature. The contents of the bottle were filtered to remove any unreacted nylon 11 and the methylene chloride layer of the two-phase mixture was separated from the aqueous layer using a separating funnel and carefully washed with water. The solid N-chlorinated nylon 11 was recovered by precipitation by pouring the methylene chloride into swirling hexane. An 87% yield of N-chlorinated nylon 11 was obtained (M.P. 90° C.). It, also, could be recovered by evaporation of the methylene chloride. Infrared spectra of a sample of the product showed the absence of the (—NH—) absorbance at 3150 cm$^{-1}$ and a shift in the carbonyl band (from 1640 cm$^{-1}$ for (—CONH—) to 1665 cm$^{-1}$ for the N-chlorinated polymer), indicating complete formation of N-chlorinated nylon 11. A 3% solution of the product in methylene chloride was prepared for coating. Nylon 11 is a type of nylon derived from 11-aminoundecanoic acid. Presumably N-chlorination takes place on the surface of the nylon pellet. The chlorinated nylon dissolves readily in the methylene chloride phase exposing fresh surfaces for further chlorination. The N-chlorinated nylon 11 is readily soluble in methylene chloride and the resulting solution can be applied directly to an EPDM weatherstrip. Unmodified nylon 11, on the other hand, is only soluble in solvents such as formic acid and meta-cresol which are not suitable for coating applications.

EXAMPLE 2

Abrasion Resistance of Coated Weatherstrip (Untreated Coating)

A cured EPDM automotive sponge weatherstrip (automotive N-body type) was coated with a thin uniform film (a few mils thick) of the N-chlorinated nylon 11 solution prepared according to Example 1, above. A brush was used to apply the coating. The solvent was evaporated and the weatherstrip was tested for abrasion resistance on a Wyzenbeek Abrasion Tester. The abrasion tester was set for a 3 lbs. load with 5 lbs. tension on the specimen. The abrasion resistance was tested against a steel panel coated with automotive paint. After 20 cycles at room temperature, the weatherstrip had completely failed (the specimen broke and a large amount of rubber had transferred to the painted metal panel).

EXAMPLE 3

Abrasion Resistance of Coated Weatherstrip (Heat Treated Coating)

A cured EPDM sponge weatherstrip was coated with the N-chlorinated nylon solution and dried as in Example 2, above. The coated weatherstrip was heated for 1 hour at 100° C. Infrared spectra of the coated surface indicated complete conversion of the N-chlorinated nylon to the amide (—NH—) form and a return of the carbonyl band to 1640 cm$^{-1}$. The coated weatherstrip, after waiting a few hours to insure that all of the HCl had escaped, was tested for abrasion resistance as in Example 2. After 41,000 cycles, the sample was completely intact with no transfer of rubber to the painted metal panel.

EXAMPLE 4

Abrasion Resistance of Coated Weatherstrip (UV Treated Coating)

A cured EPDM sponge weatherstrip was coated with the N-chlorinated nylon-11 solution and dried as in Example 2. The coated weatherstrip was irradiated with three UV lamps (200 watts/inch output each) for 2.5 seconds. Infrared spectra indicated complete conversion of the coating back to the amide (—NH—) form and a return of the carbonyl band. This weatherstrip then was tested for abrasion resistance as in Example 2, above. After 80,000 cycles, the sample was completely intact with no transfer of rubber to the painted panel.

EXAMPLE 5

Abrasion Resistance of Uncoated Weatherstrip

Uncoated, cured EPDM weatherstrip was tested for abrasion resistance as in Example 2, above. After 20 cycles, the weatherstrip had broken with a large amount of rubber transferred to the painted metal panel.

EXAMPLE 6

A cured EPDM automotive weatherstrip sponge (automotive N-Body type) was coated with a thin film of chlorinated nylon 11 solution prepared as in Example 1, above. A brush was used to apply the coating which was then dried. Then, the applied coating was cured by treatment with UV as in Example 4, above. Wyzenbeek abrasion resistance, ice adhesion and coefficient of friction were determined for the coated weatherstrip and compared with an uncoated weatherstrip. Data were obtained both before and after weathering for 200 hours in a Weather-Ometer. A non-coated control was used for comparison. A significant improvement in all three properties resulted from using the chlorinated, UV treated nylon 11 coating. The data obtained are shown in Table 1, below:

TABLE 1

| Weatherstrip | Wyzenbeek Abrasion (Cycles) | | Ice Adhesion (Newtons)** | |
| --- | --- | --- | --- | --- |
| | Non-Weathered | Weathered | Non-Weathered | Weathered |
| Non-Coated | ≲20 | ≲20 | 22 | 33 |
| Coated with Chlorinated UV Treated | >>125,000* | >>110,000* | 8.5 | 19.3 |

TABLE 1-continued

Nylon 11

| Weatherstrip | Coefficient of Friction** | |
|---|---|---|
| | Non-Weathered | Weathered |
| Non-Coated | 1.7 | 1.2 |
| Coated with Chlorinated UV Treated Nylon 11 | 0.5 | 0.45 |

*the test was terminated at the indicated cycle times.
**best results are indicated by the lowest figures.

EXAMPLE 7

A solid (non-cellular) cured EPDM stock used for automotive glass run window channel was coated with a chlorinated nylon 11 solution and UV treated using materials and procedures described in Example 6, above. The abrasion resistance of the flat stock was tested using a scuff resistance tester equipped with a ground-glass abrasion tool. The coated and treated flat stock passed 810 cycles compared to 1 cycle for an uncoated flat stock.

EXAMPLE 8

N-chlorinated Nylon 6

Pellets of Nylon 6 (10 gms), CHLOROX (250 gms, 5.25% aqueous sodium hypochlorite), methylene chloride (250 ml) and concentrated aqueous HCl (20 gms) were placed in a pint bottle. The contents of the bottle were stirred for 7½ hours at 5° C. The original nylon 6 pellets had dissolved after this period of time. The methylene chloride layer was separated from the aqueous layer using a separatory funnel and washed twice with water. After evaporation of the methylene chloride, an amorphous solid product remained (11.79 gms). The infrared spectra of a sample of the product showed the absence of the (—NH—) absorbance at 3150 cm$^{-1}$ and a shift in the carbonyl band (from 1640 to 1665 cm$^{-1}$), indicating complete formation of N-chlorinated nylon 6. Nylon 6 is a type of nylon made by ring opening polymerization of epsilon caprolactam.

EXAMPLE 9

N-chlorinated Nylon 6,6

The same procedure used for chlorinating nylon in Example 8, above, was followed except that 10 gms of nylon 6,6 pellets were stirred with 250 gms CHLOROX, 250 ml of methylene chloride and 20 gms of concentrated aqueous HCl. A solid product, a powder (11.15 gms) was obtained which was soluble in methylene chloride. Infrared spectra of a sample of the product indicated complete formation of N-chlorinated nylon 6,6. Nylon 6,6 is a type of nylon made by condensing hexamethylene diamine with adipic acid.

EXAMPLE 10

N-chlorinated Nylon 12

The same procedure as used for chlorinating nylon 6 in Example 8, above, was followed except that 10 gms of nylon 12 pellets were stirred with 250 gms CHLOROX, 250 ml of methylene chloride and 20 gms of concentrated aqueous HCl. An amorphous solid product was recovered (11.21 gms) which was soluble in methylene chloride. Infrared spectra of a sample of the product showed complete formation of N-chlorinated nylon 12. Nylon 12 is a type of nylon made by the polymerization of lauryl lactam (dodecanoic lactam) having 11 methylene groups between the linking (—CONH—) groups in the polymer chain.

EXAMPLE 11

Cured EPDM automotive weatherstrip sponges (automotive N-Body type) were coated, respectively, with the N-chlorinated nylon 6, nylon 6,6 and nylon 12 (Examples 8, 9 and 10 above). Coatings were prepared and cured by UV to the amide (—NH—) form as described in Example 4, supra. Wyzenbeek abrasion resistance was determined for the coated samples and compared with an uncoated weatherstrip sponge as shown in Table 2, below:

TABLE 2

| Coating | Wyzenbeek Abrasion Cycles |
|---|---|
| N—Chlorinated nylon 6,6 | 2,640 |
| N—Chlorinated nylon 6 | 3,520 |
| N—Chlorinated nylon 12 | 1,760 |
| Uncoated | 20 |

EXAMPLE 12

Nylon 11 pellets were chlorinated on the amide nitrogen using hypochlorous acid according to the method of Example 1, supra. After chlorination, the product (N-chlorinated nylon) was readily soluble in solvents such as methylene chloride whereas the starting material nylon 11 was insoluble. Cured EPDM cellular weatherstrip was coated with a methylene chloride solution (4%) of the N-chlorinated nylon, and the methylene chloride as well as water were evaporated completely. After UV treatment ( ≲350 nm, ~8 seconds), the nitrogen-bonded chlorine was released and the amide (—NH—) form was restored (FT-IR-ATR) to give a smooth and non-sticky layer. The coating layer released trace amounts HCl gas continuously over ~½ day after UV irradiation. After the HCl release ceased, a coated weatherstrip with good properties was obtained. Wyzenbeek abrasion-resistance of the weatherstrip was increased to more than 134,000 cycles for the coated weatherstrip compared to ~20 cycles for an uncoated weatherstrip. Ice adhesion properties were equivalent to a siloxane coated weatherstrip, and coefficient of friction was similar to that of other coated materials. The EPDM used to make the cellular weatherstrips contained about 72 parts ethylene and had very high unsaturation whereas the EPDM used to make the stock of Example 7 contained about 50 parts of ethylene and had very high unsaturation.

The EPDM weatherstrip, solid or cellular, were made from sulfur cured and carbon black reinforced extruded rubbery copolymers. The cellular or sponge weatherstrips were blown with dinitrosopentamethylene tetramine.

nm: Nanometer (millimicron)
FT-IR-ATR: Fourier Transform-Infrared-Attenuated Total Reflectance

What is claimed is:

1. The method which comprises dispersing pellets of a solid thermoplastic polymer having (—CONH—) groups selected from the group consiting of a polyacrylamides, polyamide-imides, polysulfonamides, polyurethanes, polyureas, polyurethane-ureas, polyamides and mixtures thereof in a blend of an aqueous solution of a halogenating agent and an organic solvent that is immiscible with water and inert under the reaction conditions and that readily dissolves the reaction product but not the orginal (—CONH—) polymer and brominating or chlorinating said polymer with a brominating agent or chlorinating agent for a period of time and at a temperature sufficient to form (—NX—) units, where X is a bromine or chlorine, to form a one to 50% solution of N-brominated or N-chlorinated thermoplastic polymer in said organic solvent.

2. The method according to claim 1 which additionally comprises treating said solution to separate said solvent from said N-brominated and N-chlorinated thermoplastic polymer and drying said polymer to provide a finely divided and solid N-brominated or N-chlorinated thermoplastic polymer.

3. The method according to claim 1 wherein said thermoplastic polymer is a polyamide.

4. The method according to claim 3 where said polyamide is a nylon.

5. The method according to claim 4 where said nylon is a nylon derived from 11-aminoundecanoic acid.

6. The method according to claim 1 where said thermoplastic polymer is a nylon derived from 11-aminoundecanoic acid, said organic solvent is methylene chloride and said chlorinating agent is aqueous sodium hypochlorite with concentrated hydrochloric acid and further containing the additional steps of separating the aqueous layer from the organic solvent layer formed and separating the organic solvent from the chlorinated nylon and drying the same to obtain a finely divided and solid N-chlorinated nylon.

* * * * *